United States Patent [19]

Agopian

[11] Patent Number: 5,503,424

[45] Date of Patent: Apr. 2, 1996

[54] COLLAPSIBLE UTILITY CART APPARATUS

[76] Inventor: Serge Agopian, 412 Bryant St., San Francisco, Calif. 94107

[21] Appl. No.: 363,648

[22] Filed: Dec. 22, 1994

[51] Int. Cl.$^6$ .................................................. B62B 3/02
[52] U.S. Cl. ........................ 280/651; 280/47.34; 414/341; 414/498
[58] Field of Search ................................. 414/341, 498; 296/20, 22; 280/43.24, 47.34, 47.35, 35, 641, 651

[56] References Cited

U.S. PATENT DOCUMENTS

| | | | |
|---|---|---|---|
| 2,603,500 | 7/1952 | Messier | 280/43.24 X |
| 3,082,016 | 3/1963 | Pratt | 296/20 X |
| 3,889,963 | 6/1975 | Brattgard | 296/20 X |
| 4,170,379 | 10/1979 | Eicher | 296/20 |
| 4,369,985 | 1/1983 | Bourgraf et al. | 296/20 X |
| 4,492,388 | 1/1985 | de Wit | 280/651 |
| 4,624,467 | 11/1986 | Burns | 280/40 |
| 4,682,810 | 7/1987 | Zarka | 296/20 |
| 5,004,263 | 4/1991 | Hubbard | 280/645 |
| 5,084,922 | 2/1992 | Louit | 296/20 X |

FOREIGN PATENT DOCUMENTS 66159  2/1974  Australia.

Primary Examiner—Margaret A. Focarino
Assistant Examiner—Michael Mar
Attorney, Agent, or Firm—Flehr, Hohbach, Test, Albritton & Herbert

[57] ABSTRACT

A collapsible utility cart apparatus (10) including a basket device (11) having a generally vertical first side wall second side wall (13, 13'), and spaced-apart support wheels (14, 15 and 14', 15') rotatably mounted to a bottom wall (12) of the basket device (10). A first and a second frame member (16, 16') are mounted to a respective side wall (13, 13') of the basket device (11) for pivotal movement of the frame members (16, 16') in a respective plane substantially parallel to and adjacent the side walls (13, 13') between a deployed position and a stored position. In the deployed position, the basket device (11) is vertically supported by the frame members (16, 16') to position the bottom wall (12) and the support wheels (14, 15 and 14', 15') off the ground a predetermined height. In the stored position, the respective frame members (16, 16') are positioned substantially adjacent the side walls (13, 13'), respectively, for storage.

14 Claims, 3 Drawing Sheets

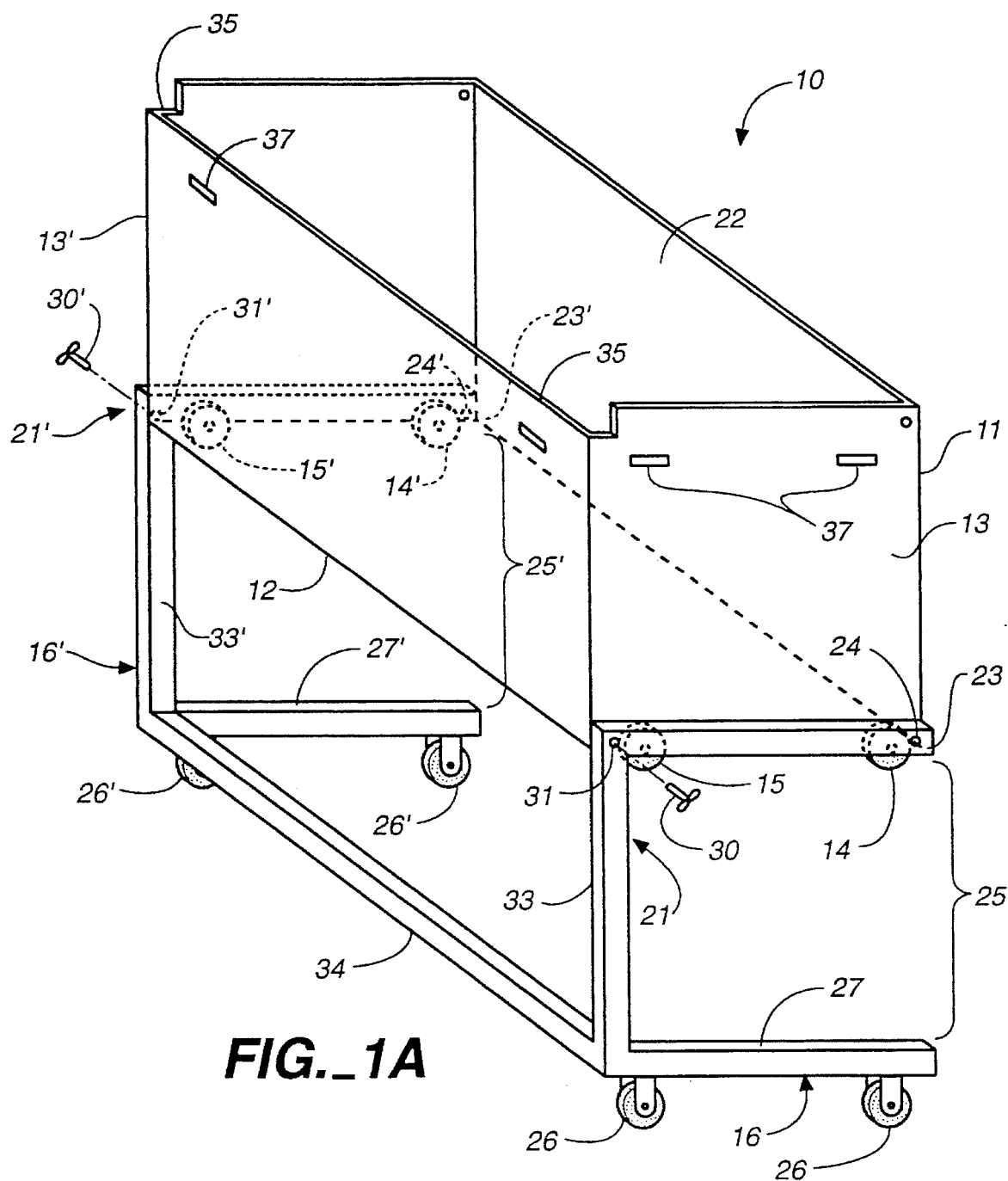
FIG._1A

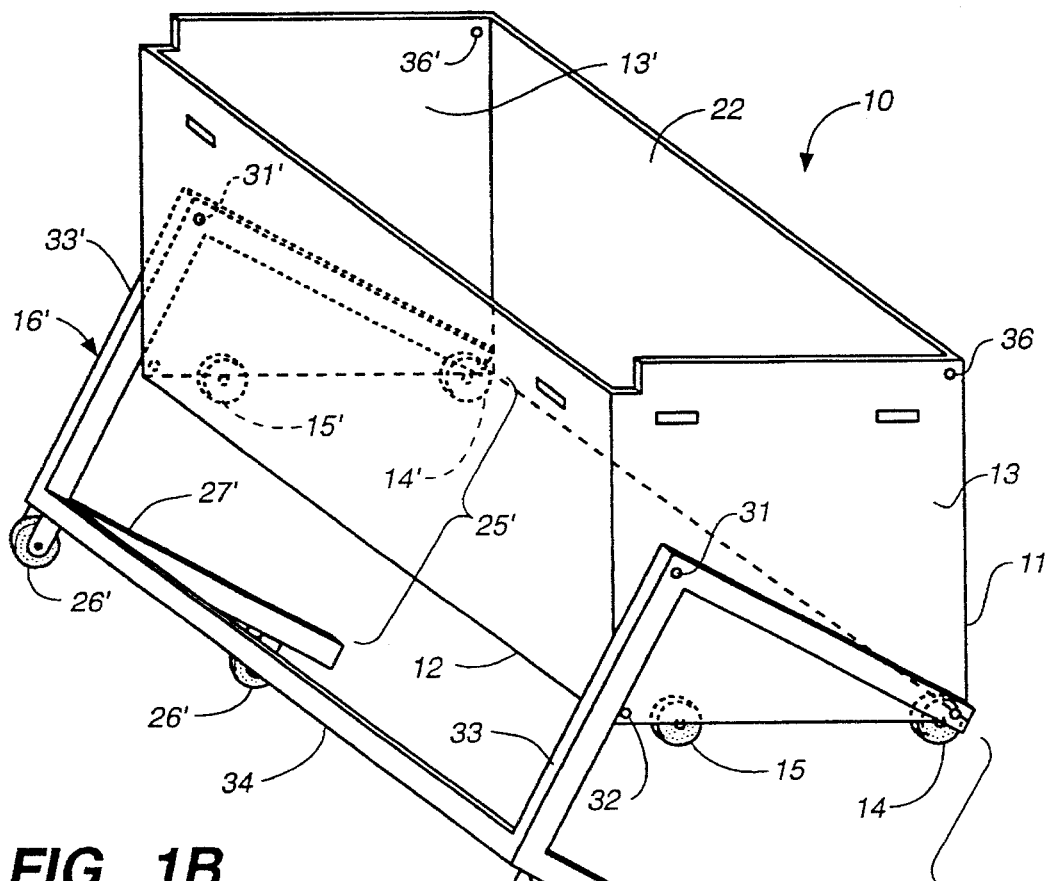
FIG._1B
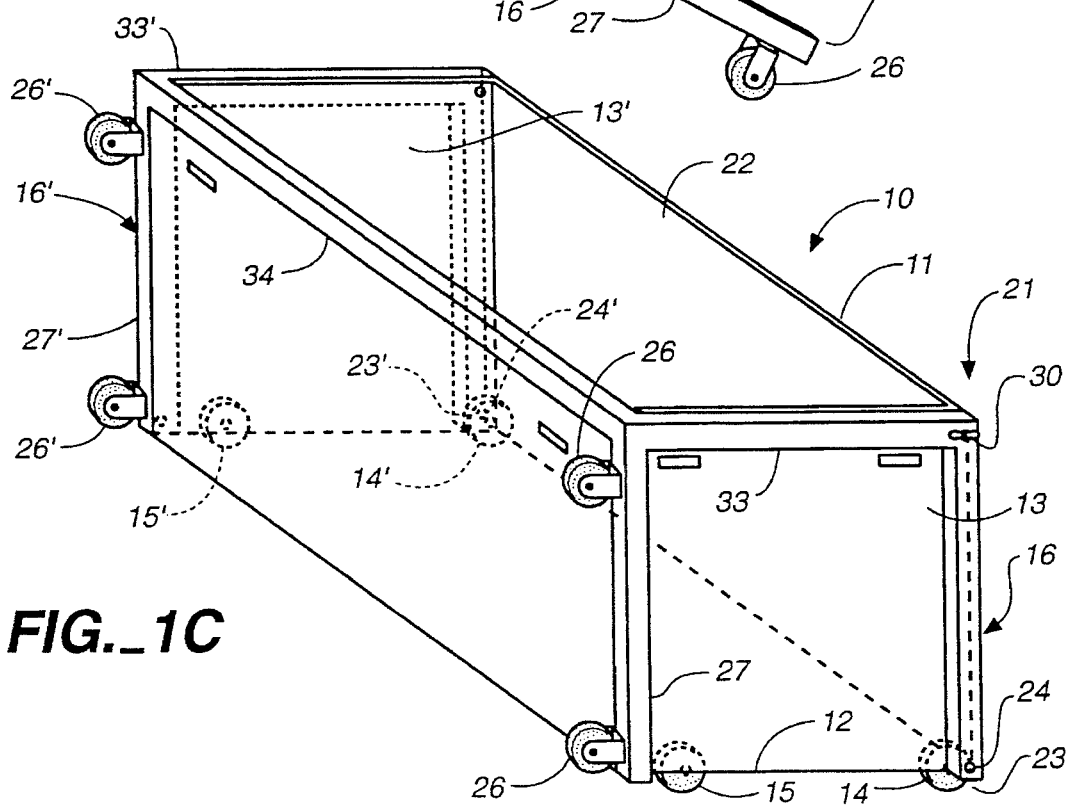
FIG._1C

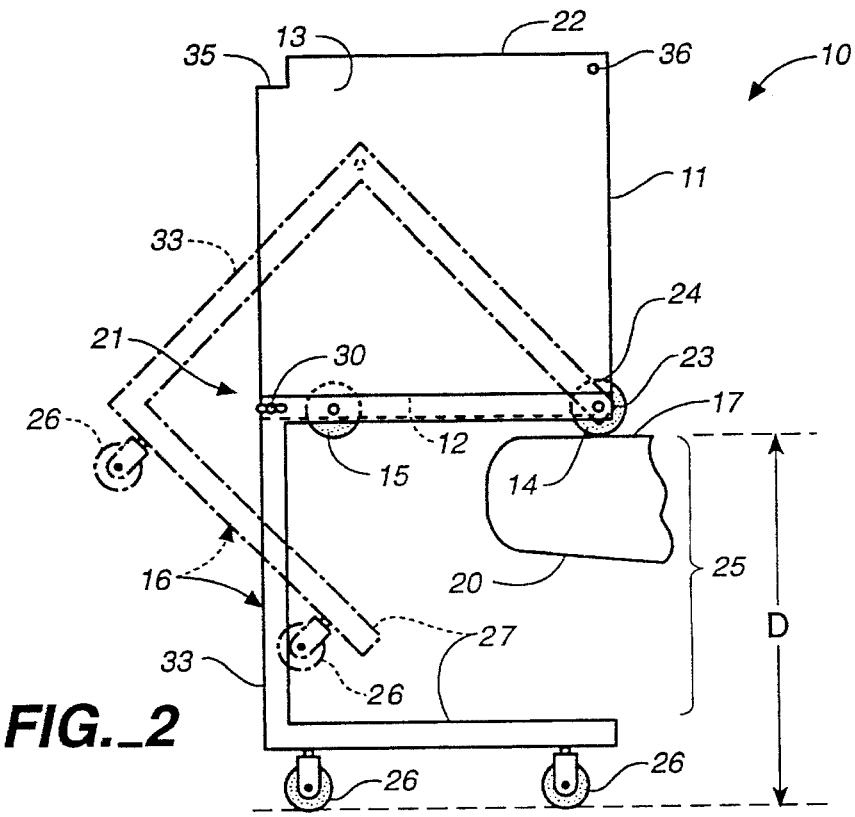
FIG._2
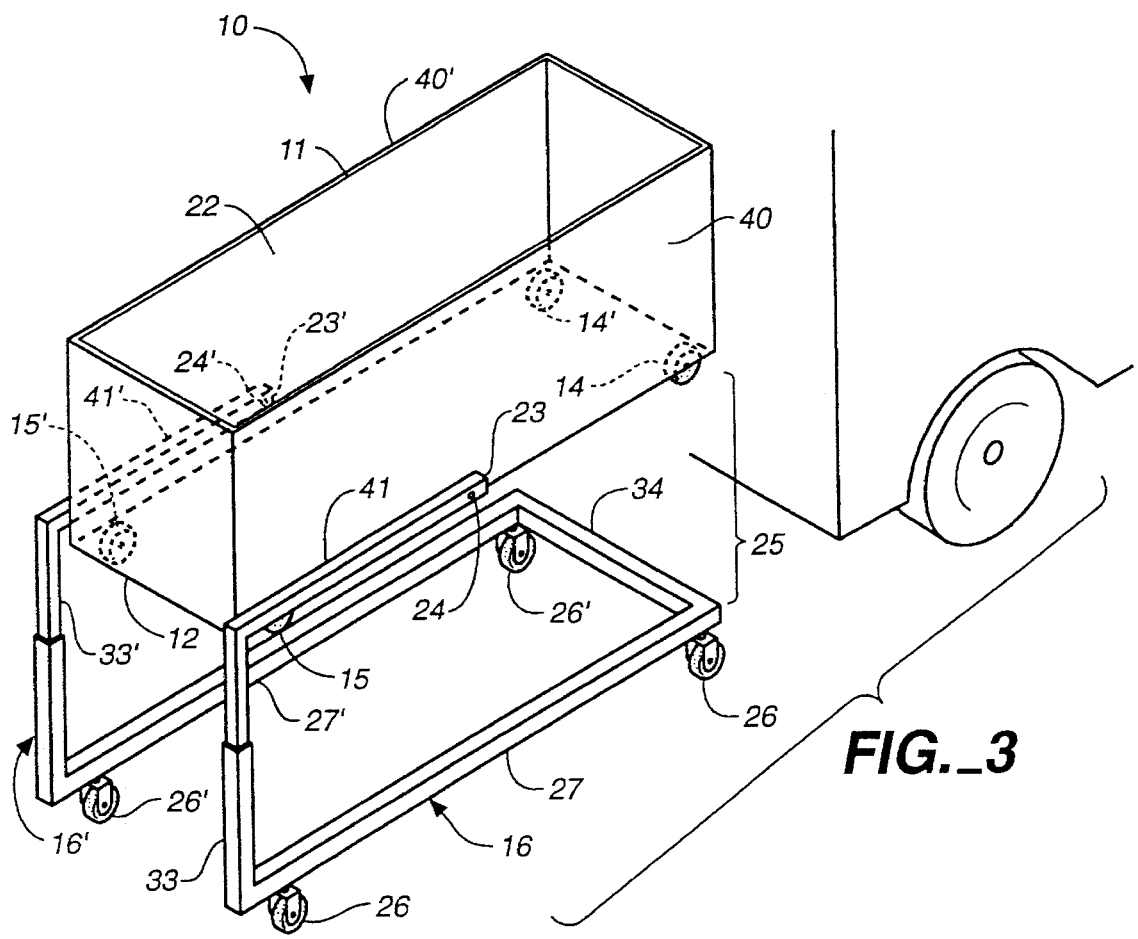
FIG._3

COLLAPSIBLE UTILITY CART APPARATUS

TECHNICAL FIELD

The present invention relates, generally, to utility cart apparatus, and more particularly, relates to collapsible utility cart apparatus for storage in automobiles

BACKGROUND ART

Shopping carts of the type employed in large numbers at grocery stores or supermarkets have remained relatively unchanged over the years. These carts typically include a wire basket rigidly mounted to a frame, and rollers mounted to the frame bottom for rolling support thereof.

One problem associated with these shopping carts is that after purchase of the items, and transport from the store to the automobile, the shopping bags must be unloaded from the cart to the car. In some instance, such as when shopping at bulk wholesale food centers, grocery bags are not even provided so that the items must be individually unloaded. Subsequently, the carts are either left in the parking space, reducing parking, or the users return the carts to a common checkpoint. Moreover, once at home, the groceries must be unloaded from the car and brought into the home bag by bag. This task is especially difficult and burdensome when the distance from the car to the home is far or several trips are required.

Other disadvantages associated with these shopping carts is that the supermarket owners must provide storage space, both inside the store and outside the store, for all the carts. These carts, further, must be frequently collected from the parking lots by supermarket personnel, and replaced or repaired when stolen or broken due to normal wear. Hence, the supermarkets overhead is increased which, of course, is passed onto the consumer.

In some institutions, in an effort to avoid theft, the travel of the carts are limited within the confines of a fence in the parking lot. This only adds to the customer's inconvenience because they must then carry their items to the car from that point. In other instances, coin deposits are required to unlock the shopping carts for use. After use of the cart, the customer is forced to either forfeit their coin each time they shop or return the cart to a common check point for return of their deposit.

In response to these above-mentioned problems, portable collapsing shopping carts have been developed which are capable of storing in an automobile. Typical of patented prior art collapsible carts are those disclosed in U.S. Pat. Nos.: 4,624,467; 4,492,388; and 3,082,016. These carts, however, generally include complex interengaging components necessary to effect collapse. Accordingly, costs are increased as well as potential for breakage. Moreover, some of these carts require removal of the items from the basket so that the cart may be collapsed.

DISCLOSURE OF INVENTION

Accordingly, it is an object of the present invention to provide a shopping cart which is collapsible.

Another object of the present invention is to provide a collapsible shopping cart which is transportable in a vehicle.

Yet another object of the present invention is to provide a shopping cart which can be collapsed without removing the groceries from storage therein.

It is a further object of the present invention to provide a collapsible shopping cart which is durable, compact, easy to maintain, has a minimum number of components, and is easy to use by unskilled personnel.

In accordance with the foregoing objects, the present invention provides a utility cart apparatus including a basket device having a bottom wall, a generally vertical first side wall, and an opposing generally vertical second side wall. At least two spaced-apart support wheels are included rotatably mounted to the bottom wall, and a rigid first frame member and an opposite rigid second frame member providing vertical support of the basket device. Each the first frame member and the second frame member mounted to a respective first side wall and second side wall for pivotal movement in a respective plane substantially parallel to and adjacent the side wall between a deployed position and a stored position. In the deployed position, the basket device is vertically supported to position the bottom wall and the support wheels off the ground a predetermined height. In the stored position, the respective frame member is positioned substantially adjacent the side wall for storage. A locking mechanism releasably locks the first frame member and the second frame member to basket device when the frame members are situated in the deployed position.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

FIGS. 1A–1C are a series of top perspective views of a collapsible utility cart apparatus constructed in accordance with the present invention illustrating movement of the frame members between the deployed position and the stored position.

FIG. 2 is a side elevation view of the cart apparatus of FIG. 1 illustrating movement of the support wheels onto a bumper of an automobile.

FIG. 3 is a top perspective view of an alternative embodiment of the present invention.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Turning now to the drawings, wherein like components are designated by like reference numerals throughout the various figures, attention is directed to FIGS. 1A–1C where the collapsible utility cart apparatus, generally designated 10, of the present invention is illustrated in various stages of collapse. Utility cart apparatus 10 includes a basket device 11 having a bottom wall 12, a generally vertical first side wall 13, and an opposite generally vertical second side wall 13'. At least two spaced-apart support wheels 14, 15 and 14', 15' are included rotatably mounted to bottom wall 12. The present invention further includes a rigid first frame member 16 and an opposite rigid second frame member 16' providing vertical support to the basket device 11. Each of first frame member 16 and second frame member 16' is mounted to a respective first side wall 13 and second side wall 13' for pivotal movement of the frame member in a respective plane substantially parallel to and adjacent the side wall between a deployed position (FIG. 1A) and a stored position (FIG. 1C). In the deployed position, basket device 11 is vertically supported by the frame members 16, 16' to position bottom wall 12 and support wheels 14, 15 and 14', 15' off the ground a predetermined height which preferably coincides with the height of the top surface 17 of a bumper 20 of an automobile (FIG. 2). In the stored position, the respective frame members 16, 16' are positioned substantially adjacent side walls 13, 13', respectively, for storage. A locking mechanism, generally designated 21, releasably locks first frame member 16 and second frame member 16' to basket device 11 when in frame members 16, 16' are situated in the deployed position.

Accordingly, the present invention provides a non-complex utility cart apparatus which can be collapsed to permit storage and transportation in an automobile. This collapsible feature can be performed without removing the stored items from the basket device. Hence, this utility cart arrangement enables easier loading into and unloading from the automobile, as well as eliminating the need for use of paper or plastic bags.

In the preferred form, basket device 11 is elongated and rectangular parallelepiped-shaped having an opening 22 therein to position and store grocery items (not shown) Opposite side walls 13, 13', thus are generally vertical and have square or rectangular-shaped faces. Basket device 11 is preferably of a length, depth and height to be positioned in a rear storage compartment of a mini-van, station wagon, pick-up truck, jeep or other flat-bed vehicle, as will be discussed in greater detail below. The shape of basket device 11, however, can be of other geometric configurations without departing from the true spirit and nature of the present invention.

Basket device 11 further is preferably constructed of a light weight wire-net type frame (not shown) similar to conventional supermarket shopping carts. The walls of basket device could be composed of a solid material as well.

FIGS. 1 and 2 best illustrate that first frame member 16 and second frame member 16' are preferably unitary, rigid and U-shaped members having one end portion 23, 23' pivotally mounted through a hinge or pivot pin 24, 24' to the adjacent side wall 13, 13' of basket device 11. Frame members 16, 16' are oriented to pivot about a substantially horizontal axis for pivotal movement of the frame members in a plane substantially parallel to and adjacent the respective side walls 13, 13' between the deployed position (FIGS. 1A and in solid lines in FIG. 2), and the stored position (FIG. 1C).

In the deployed position, frame members 16, 16' are situated to vertically position bottom wall 12, and support wheels 14, 15 and 14', 15' off the ground a predetermined distance (D). As shown in FIG. 2, this distance preferably coincides with the top surface 17 of rear bumper 20 of an automobile (not shown) so that utility cart apparatus 10 can be easily rolled onto and in the rear compartment of the automobile (i.e, a mini-van, jeep, etc.). While the present invention may operate with only two support wheels rotatably mounted to basket device 11, preferably four support wheels are provided rotatably mounted proximate the four corners of bottom wall 12. Preferably, the support wheels are directionally fixed to the basket device (as shown in the figures) for rotation about fixed horizontal axes. In this embodiment, front support wheels 14, 14' may be rotatably mounted to the basket device through pivot pin 24, 24' (FIG. 2) for co-axial rotation thereabout. However, the support wheels may be additionally mounted to the basket device for directional rotational movement about a vertical axis, similar to a caster wheel.

Accordingly, by orienting the open end portion 25, 25' of U-shaped frame members 16, 16' in the direction of rolling support of support wheels 14, 15 and 14', 15', when the frame members are situated in the deployed position, the support wheels rollingly contact top surface 17 to enable basket device 11 to rolled up and onto bumper 20. Subsequently, as shown in phantom lines in FIG. 2, frame member 16 can be pivotally moved about pivot pin 24 from the deployed position to the stored position for storage of the basket device without requiring removal of the items stored therein (not shown). The support wheels rotatably mounted to the bottom wall further enable positioning of the utility cart into the vehicle rear compartment after the frame members are positioned in the stored position.

A spring member or the like (not shown) may be coupled between the frame members and the basket device biasing the frame members toward the stored position after the locking mechanism is released.

To provide rolling support of the utility cart apparatus along the ground when frame members 16, 16' are positioned in the deployed position, two pairs of roller members 26, 26' are provided rotatably mounted to the lower horizontal portions 27, 27' of each frame member 16, 16' at spaced-apart locations. Each roller member 26, 26' is provided by a standard roller, and at least two roller members are mounted to a frame member for further rotation about generally vertical axis to enable turning of the cart.

To prevent inadvertent movement of frame members 16, 16' from the deployed position, locking mechanisms 21, 21' are provided in the form of a locking pin 30, 30' to releasably lock the frame members to basket device 11. Therefore, the locking mechanisms prevent collapse of the utility cart while in normal use during shopping. FIG. 1A best illustrates that locking pins 30, 30' are formed to slidably extend through pin receiving holes 31, 31' in frame members 16, 16', respectively, to releasably interengage with the basket device. These pin receiving holes 31, 31' are aligned with locking holes 32, 32' in side walls 13, 13' (FIG. 1B), when frame members 16, 16' are situated in the deployed position, which preferably extend into side walls 13, 13' for receipt of the distal ends of locking pins 30, 30'.

To release locking pins 30, 30' from interengagement with receiving holes 31, 31' and locking holes 32, 32', the locking pins are pulled out therefrom to allowing the frame members to move from the deployed position to the stored position. For example, upon rolling movement of the support wheels onto bumper 20 (FIG. 2), or of basket device 11 into the rear compartment of the vehicle, locking mechanism 21, 21' may be disengaged to enable release of the frame members from locked engagement with the corresponding side walls. The frame members can then be pivotally moved toward the stored position.

During movement toward the stored position, frame members 16, 16' are rotated in their respective rotating planes to a stored orientation so that the collapsed utility cart apparatus 10 can better fit within the confines of the storage space in an automobile. Additionally, by drawing in the leg portions or ends of the frame members against the side walls, potential inadvertent adverse contact with objects are reduced during loading and unloading. This is accomplished by preferably positioning the frame members against and adjacent their respective side walls 13, 13', as shown in FIG. 1C, for a sleek functional appearance.

In the preferred form, U-shaped frame members 16, 16' have an outer perimeter which is dimensioned to be substantially similar to or be contained within an outer perimeter of the corresponding side walls 13, 13' when the frame members are situated in the stored position. FIG. 1C illustrates how the outer perimeters are aligned between the side wall and the adjacent frame member for compactness.

Pivot pin 24 is preferably positioned along side wall 13 in a lower corner proximate bottom wall 12. Hence, FIGS. 1A–1C illustrate the pivotal movement of the frame members from the deployed position to stored position up against the side wall. It will be appreciated, however, that depending upon the desired predetermined height (D) of the bottom wall and of the support wheels, the positioning of pivot pin 24 not only can vary along the bottom edge of the side wall, as shown in the embodiment of FIG. 3, but can also vary vertically along the side wall. Moreover, the vertical leg portions 33, 33' of the frame members may be formed for telescopic mating to adjust the predetermined height (D).

To provide lateral stability between the first frame member 16 and the second frame member 16', a stabilizing bar 34 is preferably provided extending laterally between the lower portions 27, 27' of frame members 16, 16'. This stabilizing bar 34 provides lateral support between the frame members, as well as enabling the two frame members to be moved between the stored position and the deployed position simultaneously as a unit.

A second stabilizing bar (not shown) may be added at a front portion of the frame members proximate their open end portions for additional stability during rolling movement of the cart when in the deployed condition. Stabilizing bar 34 is preferably rigidly mounted or integral with both the first frame member and the second frame member to form the single unit. Further, when the pivot pins are positioned at the bottom wall of the basket device, another stabilizing bar (not shown) may extend from the end of one frame member to the other frame member proximate the end portions 23, 23'. These additional stabilizing bars may be added as precautions should the cart be designed to carry children or heavier objects.

An upper corner portion of basket device 11 preferably provides an elongated receiving channel 35 (FIGS. 1A, 1C and 2) formed and dimensioned for receipt of stabilizing bar 34 therein when frame members 16, 16' are situated in the stored position. Hence, the upper corner portion will not prevent or impede movement of the frame members to the stored position. Alternatively, the length of frame members will have to be sufficient to extend up and over the upper corner portion.

To lock the frame members in the stored position, a second set of locking apertures 36, 36' may be provided proximate the upper side wall corner opposite the receiving channel for receipt of locking pin 30, 30', respectively. Once the pin receiving holes 31, 31' of frame members 16, 16', respectively, are aligned with the locking apertures 36, 36' of side wall 13, 13', the distal end of locking pin 30, 30' can be inserted therethrough.

Basket device 11 preferably includes a plurality of slots 37 (FIG. 1A) for mounting of a handle member (not shown) to facilitate pushing or pulling of the utility cart.

FIG. 3 illustrates an alternative embodiment of the present invention which pivotally positions frame members 16, 16' along the longitudinal side walls 40, 40'. In this embodiment, the upper horizontal portions 41, 41' are pivotally coupled to a mid-portion the side wall proximate the bottom wall. Accordingly, to position the frame members in the stored position (not shown), the frame members will have to rotate an additional 90° about the horizontal pivotal axes.

What is claimed is:

1. A utility cart apparatus comprising:

a basket device having a bottom wall, a first side wall, and an opposing second side wall;

at least two spaced-apart support wheels rotatably mounted to said bottom wall;

a rigid first frame member and an opposite rigid second frame member, each said first frame member and said second frame member mounted to a respective first side wall and second side wall for pivotal movement in a respective plane substantially parallel to and adjacent the side wall between a lowered deployed position, vertically supporting said basket device to position said bottom wall and said support wheels off the ground a predetermined height, and a raised stored position, positioning the respective frame member substantially adjacent the side wall, each said frame member being substantially U-shaped having an open end facing in a forward direction of rotation of said support wheels when situated in the deployed position to enable rolling engagement of said support wheels with an elevated support surface, and including a lower supporting portion situated generally horizontal with a ground surface when the frame members are in said deployed position;

roller members rotatably mounted to said lower supporting portions for rolling support of the respective frame member when in said deployed position; and a locking mechanism releasably locking the first frame member and the second frame member to said basket device when in said deployed position.

2. The utility cart apparatus as defined in claim 1 wherein, each said frame member is pivotally mounted to the respective side wall proximate said bottom wall.

3. The utility cart apparatus as defined in claim 1 wherein, each said frame member is pivotally mounted to the respective side wall proximate a corner of said bottom wall.

4. The utility cart apparatus as defined in claim 1 further including:

a stabilizing bar extending laterally from the first frame member support portion to the second frame member support portion.

5. The utility cart apparatus as defined in claim 4 wherein, said stabilizing bar is mounted between the lower supporting portions of said frame members.

6. The utility cart apparatus as defined in claim 5 wherein, said basket device defines an elongated channel at an upper corner portion thereof formed and dimensioned for receipt of said stabilizing bar therein when said frame members are in said stored position.

7. The utility cart apparatus as defined in claim 1 wherein, said first side wall and said second side wall is generally vertical.

8. The utility cart apparatus as defined in claim 1 further including:

at least four spaced-apart support wheels rotatably mounted to said bottom wall.

9. The utility cart apparatus as defined in claim 1 wherein, an outer perimeter of the frame members in the respective plane is contained within the outer perimeter of the respective sidewall when the frame members are situated in the stored position.

10. The utility cart apparatus as defined in claim 1 wherein, the transverse cross-sectional dimension of said basket device is rectangular.

11. The utility cart apparatus as defined in claim 1 wherein, said locking mechanism is provided by a pin member formed for sliding receipt through aligned holes in said frame members and said basket device when said frame members are situated in said deployed position.

12. The utility cart apparatus as defined in claim 1 wherein, said predetermined height is the distance between the ground and a top surface of a vehicle bumper.

13. The utility cart apparatus as defined in claim 1 wherein, said frame members include height adjustable vertical leg portions to adjust said predetermined height.

14. The utility cart apparatus as defined in claim 13 wherein, said vertical leg portions are telescopically adjustable.

* * * * *